US012620178B1

(12) United States Patent
Poot et al.

(10) Patent No.: US 12,620,178 B1
(45) Date of Patent: May 5, 2026

(54) SUPPLEMENTING DEPTH INFORMATION FOR ANCHORING

(71) Applicant: Apple Inc., Cupertino, CA (US)

(72) Inventors: Rudy Poot, Mill Valley, CA (US);
Alvin Chung, Santa Clara, CA (US);
Tomas Alvarez Rodriguez, Boulder, CO (US)

(73) Assignee: APPLE INC., Cupertino, CA (US)

( * ) Notice: Subject to any disclaimer, the term of this patent is extended or adjusted under 35 U.S.C. 154(b) by 212 days.

(21) Appl. No.: 18/142,322

(22) Filed: May 2, 2023

Related U.S. Application Data

(60) Provisional application No. 63/337,860, filed on May 3, 2022.

(51) Int. Cl.
G06T 19/00 (2011.01)

(52) U.S. Cl.
CPC .......... G06T 19/00 (2013.01); G06T 2200/24 (2013.01); G06T 2210/56 (2013.01)

(58) Field of Classification Search
None
See application file for complete search history.

(56) References Cited

U.S. PATENT DOCUMENTS

| | | | | |
|---|---|---|---|---|
| 10,740,960 | B2 * | 8/2020 | Stachniak | ............... G06T 19/20 |
| 10,832,417 | B1 | 11/2020 | Tzur | |
| 2021/0042958 | A1 | 2/2021 | Engel et al. | |
| 2021/0183161 | A1 | 6/2021 | Upendran et al. | |
| 2022/0229534 | A1 * | 7/2022 | Terre | .................. G06F 3/04815 |
| 2022/0292715 | A1 * | 9/2022 | Liu | ........................... G06T 7/73 |
| 2023/0315383 | A1 * | 10/2023 | Canberk | .................. G06T 7/70 |
| | | | | 345/633 |

* cited by examiner

*Primary Examiner* — Saptarshi Mazumder
(74) *Attorney, Agent, or Firm* — Fernando & Partners, LLP

(57) ABSTRACT
According to various implementations, a method includes obtaining pose data that indicates a plurality of poses of the electronic device within a physical environment. The method includes obtaining a representation of a three-dimensional (3D) environment. The representation of the 3D environment includes a plurality of planes. Each of the plurality of planes defines a plurality of points in xy space. The representation of the 3D environment does not include z space (e.g., depth) information. The method includes anchoring the representation of the 3D environment to a physical anchor point within the physical environment based on the pose data. The method includes anchoring a computer-generated object to the representation of the 3D environment based on the pose data. For example, the pose data includes z space (e.g., depth) information, which is used to anchor the computer-generated object to the representation of the 3D environment.

20 Claims, 12 Drawing Sheets

500

SUPPLEMENTING DEPTH INFORMATION FOR ANCHORING

CROSS-REFERENCE TO RELATED APPLICATIONS

This application is claims priority to U.S. Provisional Patent App. No. 63/337,860, filed on May 3, 2022, which is hereby incorporated by reference in its entirety.

TECHNICAL FIELD

The present disclosure relates to displaying an environment, and in particular anchoring the environment to a physical environment.

BACKGROUND

Anchoring an environment (e.g., a virtual 3D environment) includes rendering the environment such that the environment appears world-locked to a physical anchor point of a physical environment. Because rendering is a computationally expensive process, certain techniques include rendering a representation of the environment, in order to reduce computational demands associated with the anchoring. For example, the representation of the environment includes less graphical information than the environment. However, because of the lower amount of graphical information, it is challenging to efficiently anchor additional content to the anchored representation of the environment.

SUMMARY

In accordance with some implementations, a method is performed at an electronic device including one or more processors, a non-transitory memory, and a display. The method includes obtaining pose data that indicates a plurality of poses of the electronic device within a physical environment. The method includes obtaining a representation of a 3D environment. The representation of the 3D environment includes a first plurality of planes. Each of the first plurality of planes defines a plurality of points in xy space. The method includes anchoring the representation of the 3D environment to a physical anchor point within the physical environment based on the pose data. The method includes anchoring a computer-generated object to the representation of the 3D environment based on the pose data.

In accordance with some implementations, a method is performed at an electronic device including one or more processors, a non-transitory memory, and a display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION

Figure 1A:
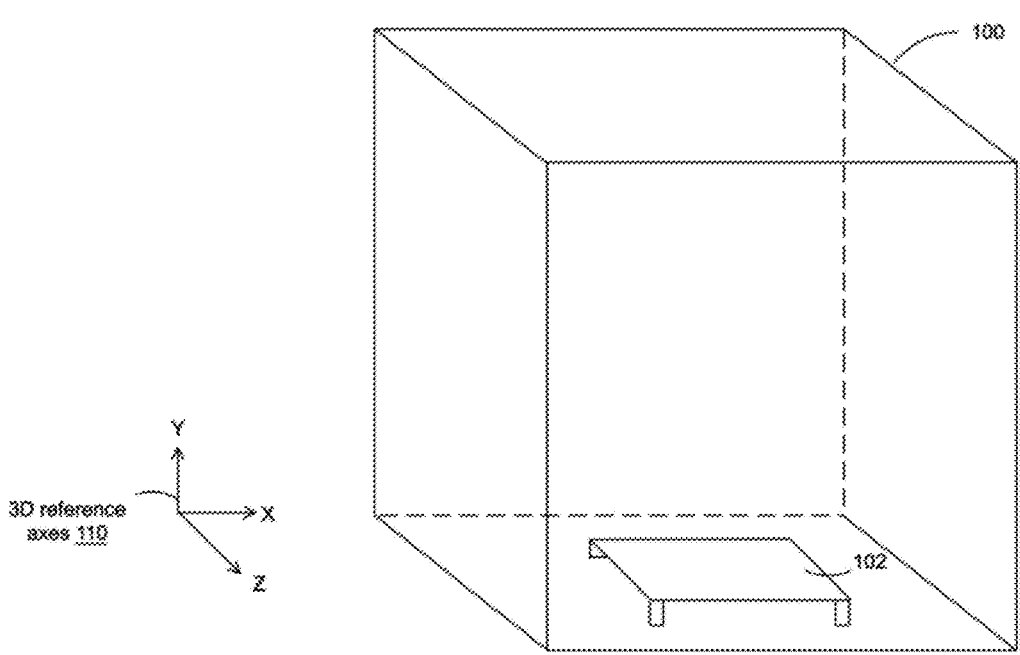
FIG. 1A is an example of a 3D environment.

In some circumstances, a device anchors an environment to a physical anchor point of a physical (e.g., real-world) environment, across a plurality of poses of the device. For example, in an augmented reality (AR) application, the device renders a 3D virtual house such that the rendered 3D virtual house appears anchored to a physical wall. Because rendering is a computationally expensive process, some techniques include rendering a simplified representation of the environment, in order to reduce computational demands associated with the anchoring. For example, the simplified representation of the environment includes information in two dimensions (e.g., xy space), whereas the environment includes information in three dimensions (e.g., xyz space). As another example, the simplified representation of the environment includes multiple 2D planes (e.g., in xy space), whereas the environment corresponds to a 3D mesh (e.g., in xyz space). In other words, in contrast to the environment, the simplified representation of the environment lacks z space (e.g., depth) information. Because of the lack of the z space information, the techniques lack a mechanism for efficiently anchoring additional content to the anchored simplified representation of the environment.

By contrast, various implementations disclosed herein include methods, systems, and electronic devices for using pose data to supplement the lack of z space information associated with a representation of a 3D environment. Namely, the representation of the 3D environment includes a plurality of planes, and each of the plurality of planes defines a plurality of points in xy space. Thus, the z space information indicated in the pose data is used to supplement the z space information not indicated by the representation of the 3D environment. In some implementations, the pose data indicates a 3D map or a 3D point cloud. To that end, in some implementations, an electronic device performs simultaneous localization and mapping (SLAM) operation with respect to image data of the physical environment and positional sensor data characterizing the position of the electronic device. The z space information enables the electronic device to anchor a computer-generated object to the representation of the 3D environment.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

FIG. 1A is an example of a 3D environment 100. The 3D environment 100 includes a 3D cube and a 3D table 102 inside of the 3D cube. The 3D environment 100 includes 3D space (xyz) information, as indicated by 3D reference axes 110. The 3D cube includes front and back walls, which each defines points along the xy axis (constant z value). The 3D cube includes two side walls, which each define points along the yz axis (constant x value). The 3D environment 100 also includes the 3D table 102, which defines points in xyz space. As one example, the 3D environment 100 corresponds to a 3D mesh. As discussed above, because the 3D environment 100 includes xyz space information, rendering the 3D environment 100 (e.g., in order to be anchored to a point of a physical environment) is computationally expensive. Accordingly, various implementations disclosed herein include anchoring a (e.g., graphically simplified) representation of a 3D environment.

Figure 1B:
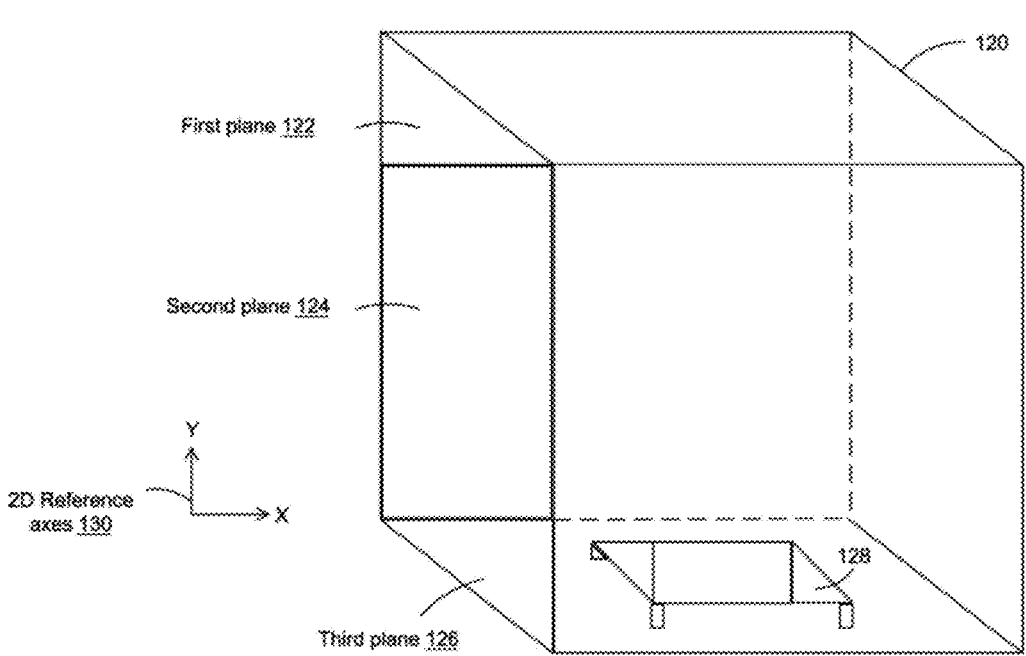
FIG. 1B is an example of a representation of the 3D environment.

FIG. 1B is an example of a representation 120 of the 3D environment 100 (referred to hereinafter as "the representation 120" for the sake of brevity). In contrast to the 3D environment 100, the representation 120 includes xy (2D) space information, but not z space information, as indicated by 2D reference axes 130. For example, the representation 120 includes tens of thousands of triangles, whereas the 3D environment 100 may include millions of triangles and more complex lighting/shading effects. The representation 120 includes a first plurality of planes, each of which defines a plurality of points in the xy space. Notably, none of the first plurality of planes defines a point in the z space. For example, rather than including z space information characterizing the left side wall, the representation 120 includes a first plane 122 (a first 2D triangle), a second plane 124 (2D rectangle), and a third plane 126 (a second 2D triangle), which collectively comprise a 2D representation of the left side wall. Each of the planes (122, 124, and 126) defines a plurality of points in xy space. Similarly, rather than including z space (e.g., depth) information regarding the table, the representation includes various planes that collectively comprise a 2D table 128. Namely, the 2D table 128 includes a triangular plane defining the back leg, two triangular planes defining the left and right portions of the surface of the table, a rectangular plane defining the middle portion of the surface, and two rectangular planes defining the two front legs of the table. The remaining planes of the representation 120 are neither illustrated nor described, for the sake of brevity and clarity.

Because the representation 120 includes less informational content than the 3D environment 100, an electronic device may anchor the representation 120 to a physical environment more efficiently (e.g., fewer graphics processing unit (GPU) cycles) than anchoring the 3D environment 100 to the physical environment. However, certain techniques cannot efficiently anchor a computer-generated object to the representation 120, due to the lack of z space (depth) information indicated by the representation 120. Accordingly, various implementations disclosed herein include supplementing the lack of z space information.

FIGS. 2A-2H are an example of an electronic device anchoring a computer-generated object to the representation 120 based on pose data in accordance with some implementations.

Figure 2A:
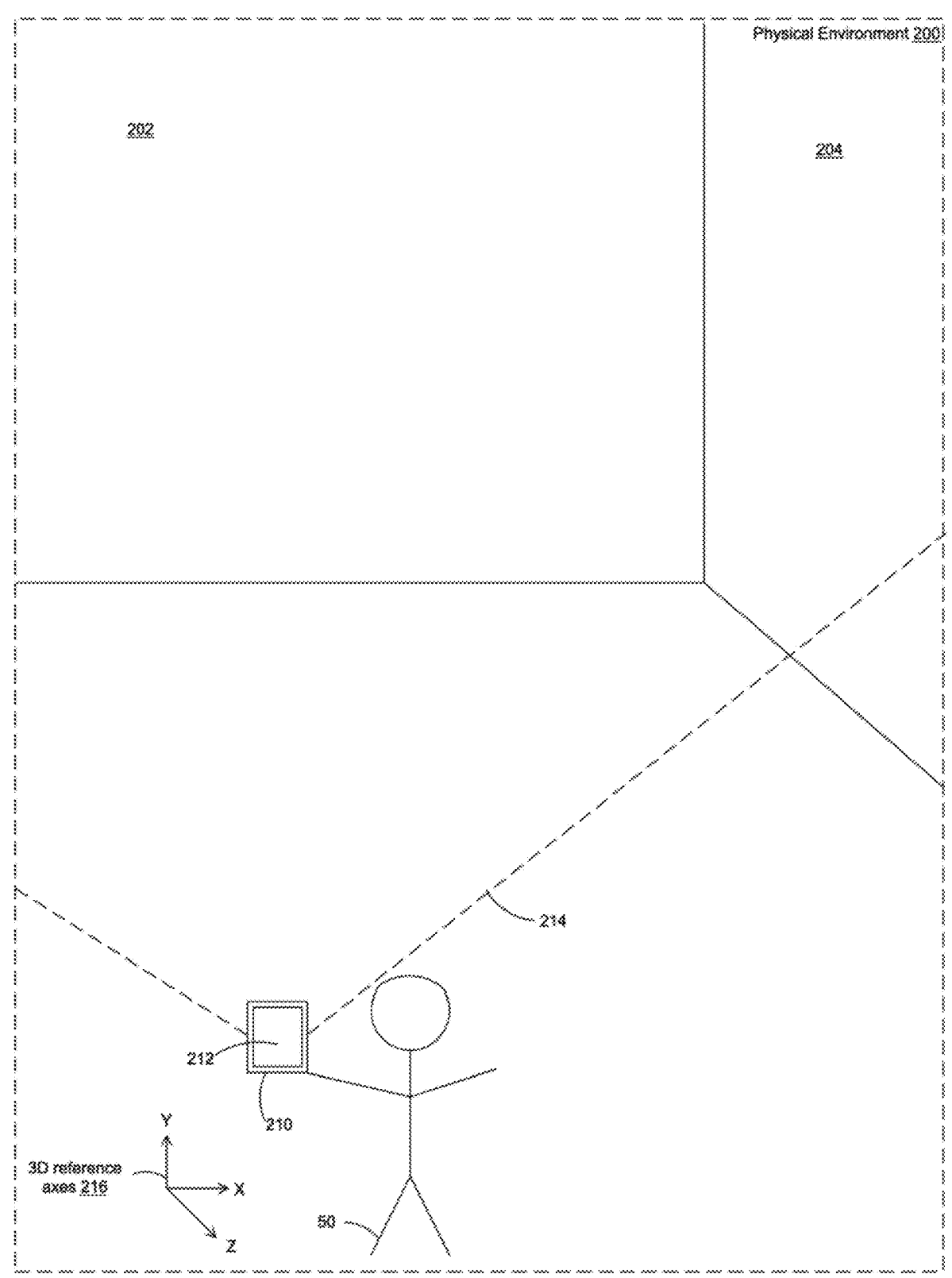
FIGS. 2A-2H are an example of an electronic device anchoring a computer-generated object to the representation of the 3D environment based on pose data in accordance with some implementations.

As illustrated in FIG. 2A, a user 50 of an electronic device 210 operates the electronic device 210 in a physical environment 200. The physical environment 200 includes a first physical wall 202 and a second physical wall 204. The physical environment 200 is characterized by 3D reference axes 216. For example, the first physical wall 202 runs along the x axis, whereas the second physical wall 204 runs along the z axis. In some implementations, the electronic device 210 corresponds to a mobile device, such as a smartphone, tablet, head-mountable device (HMD), etc. The electronic device 210 includes a display 212 that is associated with a viewable region 214 of the physical environment 200.

Figure 3:
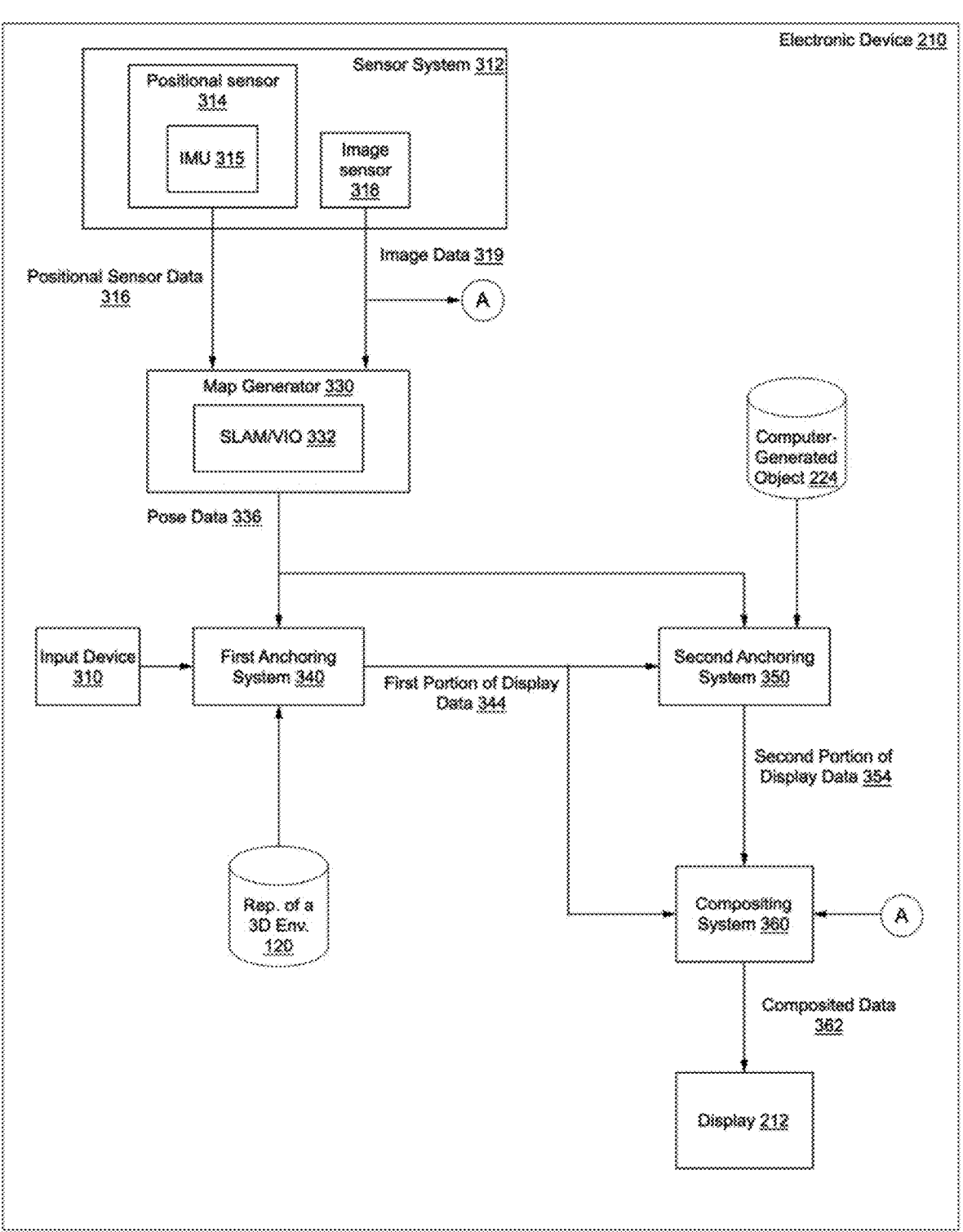
FIG. 3 is an example of a block diagram of an electronic device in accordance with some implementations.

Referring to FIG. 3, in some implementations, the electronic device 210 includes a map generator 330 that generates pose data 336 characterizing the physical environment 200. In some implementations, the pose data 336 indicates a 3D map, a 3D point cloud, or a combination thereof. In some implementations, the map generator 330 generates the pose data 336 based on positional sensor data 316 and image data 319 from a sensor system 312. The positional sensor data 316 indicates a position or movement of the electronic device 210. An example of the positional sensor data 316 is inertial measurement unit (IMU) data from an IMU 315. The image data 319 is from an image sensor 318, such as a camera with a field of view (FOV) that approximates the viewable region 214 associated with the display 212. In some implementations, the map generator 330 applies a combination of SLAM and visual inertial odometry (VIO) 332 to the positional sensor data 316 and the image data 319, in order to generate the pose data 336.

Figure 2B:
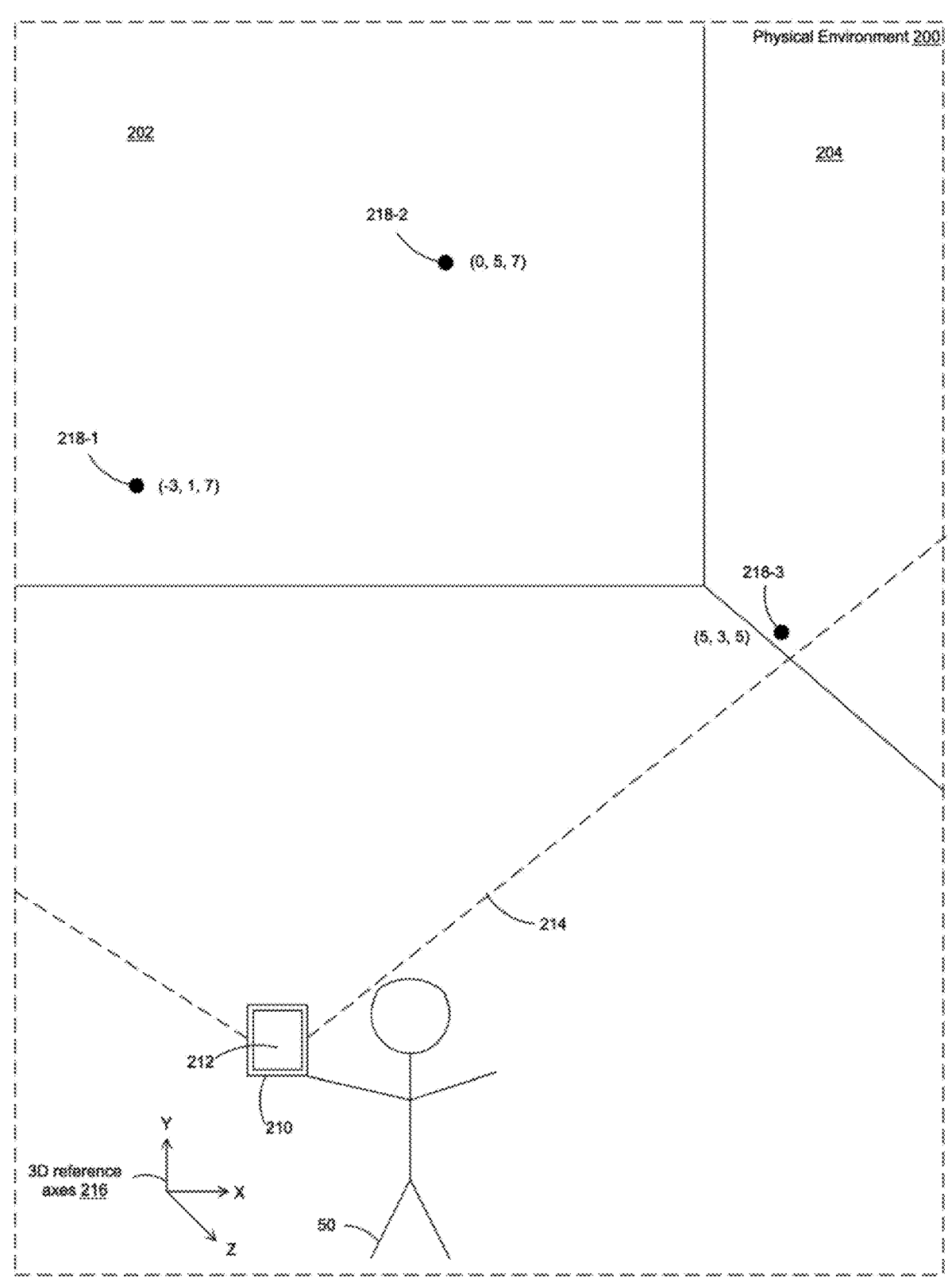
Figure 2C:
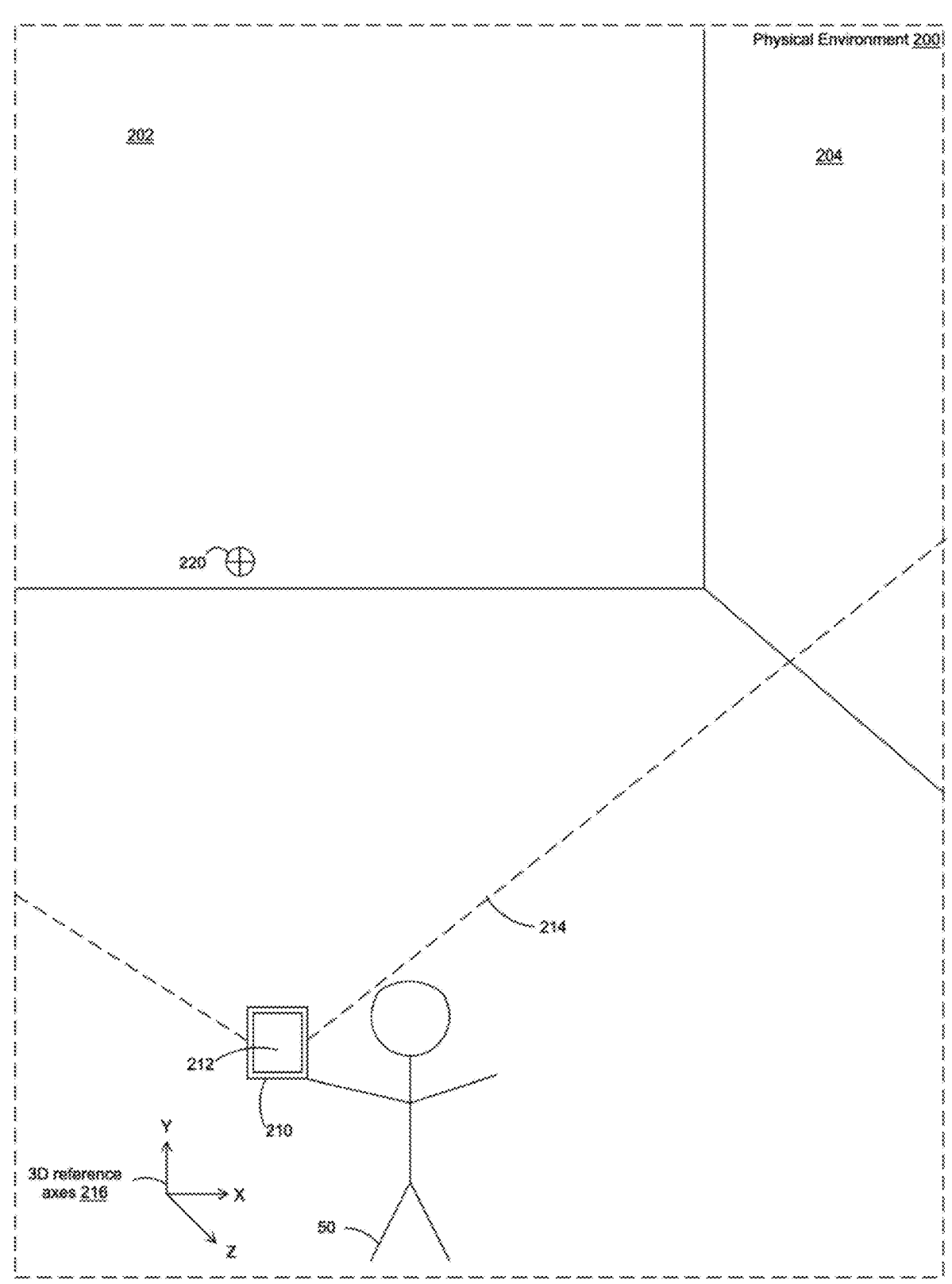

For example, referring to FIG. 2B, the pose data 336 indicates a plurality of points of a point cloud (illustrated for purely explanatory purpose). The plurality of points includes a first point 218-1 on the first physical wall 202. The first point 218-1 has a xyz coordinate value of (x=−3, y=1, z=7). The plurality of points includes a second point 218-2 on the first physical wall 202. The second point 218-2 has a xyz coordinate value of (x=0, y=5, z=7). The plurality of points includes a third point 218-3 on the second physical wall 204. The third point 218-3 has a xyz coordinate value of (x=5, y=3, z=5). One of ordinary skill in the art will appreciate that a point cloud may include any number of points, positioned at various locations within a physical environment. For the sake of clarity, the plurality of points (218-1, 218-2, and 218-3) are not illustrated in FIGS. 2C-2H.

According to various implementation, a physical environment includes a physical anchor point, to which a representation of a 3D environment is anchored. For example, with reference to FIG. 2C, the physical environment 200 includes a physical anchor point 220 (illustrated for purely explanatory purposes). One of ordinary skill in the art will appreciate that the physical anchor point 220 may be positioned at any position within the physical environment 200.

In some implementations, the electronic device 210 sets a physical anchor point independent of a user input. For example, the electronic device 210 sets the physical anchor point to a default location of the physical environment 200 corresponding to the middle of the display 212.

In some implementations, the electronic device 210 sets a physical anchor point based on a user input. To that end and with reference to FIG. 3, the electronic device 210 detects, via an input device 310, a first user input that specifies the physical anchor point. For example, the input device 310 performs computer vision based extremity tracking on an extremity (e.g., a finger) of the user 50 within the physical environment 200. As one example, based on detecting a certain gesture (e.g., finger tap) performed by the extremity, the electronic device 210 sets the physical anchor point to the current position of the extremity. Another example of the input device 310 is a computer vision based eye tracker that tracks a gaze of the user 50, wherein the gaze is directed to within the physical environment 200. For example, the eye tracker includes an eye tracking camera pointed at an eye of the user 50.

Figure 2D:
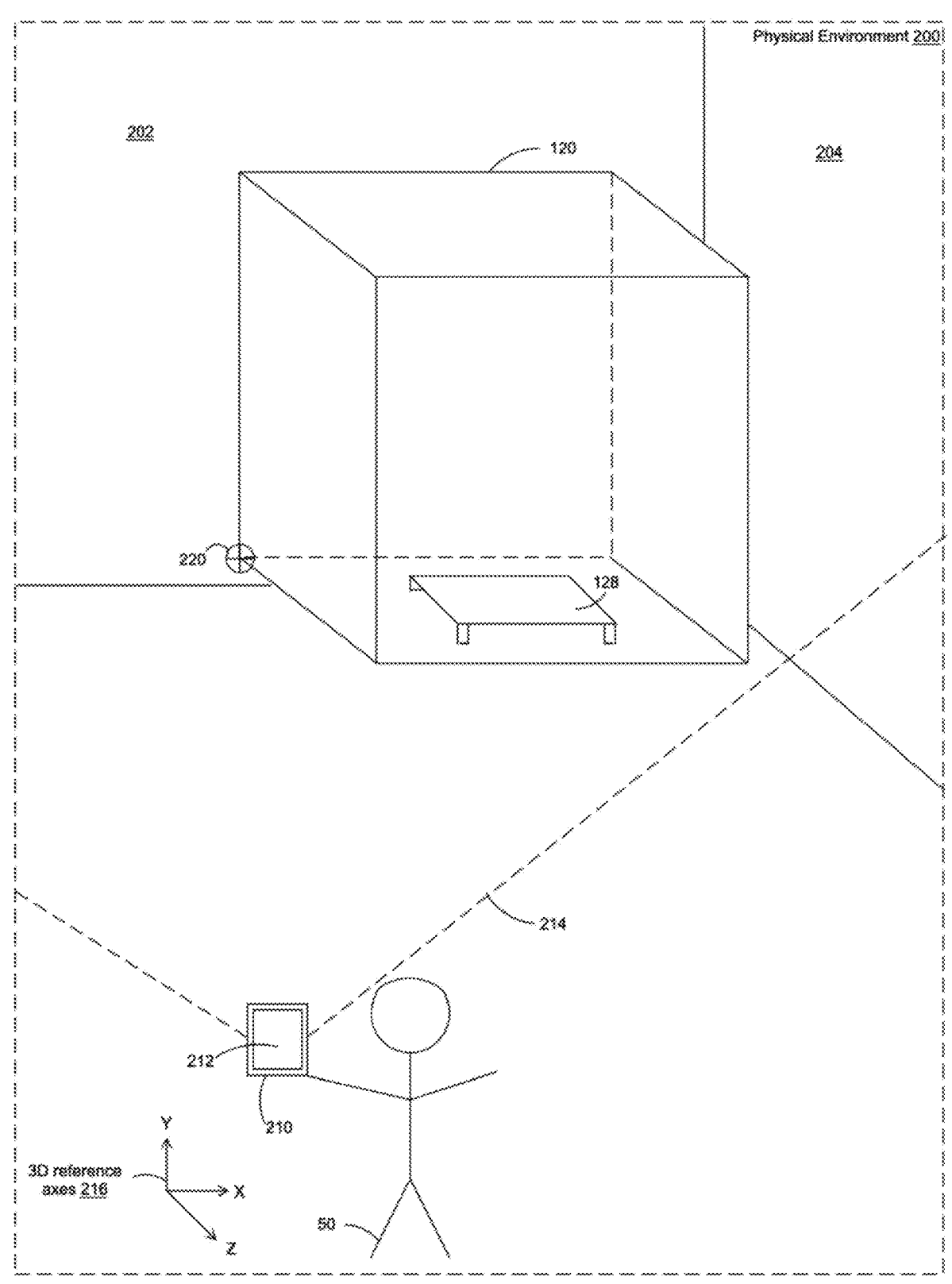

The electronic device 210 anchors the representation 120 to the physical anchor point 220 based on the pose data 336, as illustrated in FIG. 2D. For example, the anchoring is based on the plurality of points 218-1, 218-2, and 218-3. As another example and with reference to FIG. 3, the electronic device 210 includes a first anchoring system 340 that anchors the representation 120 to the physical anchor point, based on the pose data 336. To that end, in some implementations, the first anchoring system 340 renders the representation 120, based on the pose data 336, in order to generate a first portion of display data 344. The first portion of the display data 344 is displayed on the display 212. Moreover, in some implementations, the electronic device 210 includes a compositing system 360 that composites the image data

319 (e.g., pass through image data) with the first portion of display data 344, and displays the composited data 362 on the display 212.

In some implementations, the anchoring is in response to detecting the first user input that specifies the physical anchor point 220. In some implementations, the anchoring is in response to detecting a user input directed to an affordance, such as a user input selecting a "place virtual world" affordance.

Figure 2E:
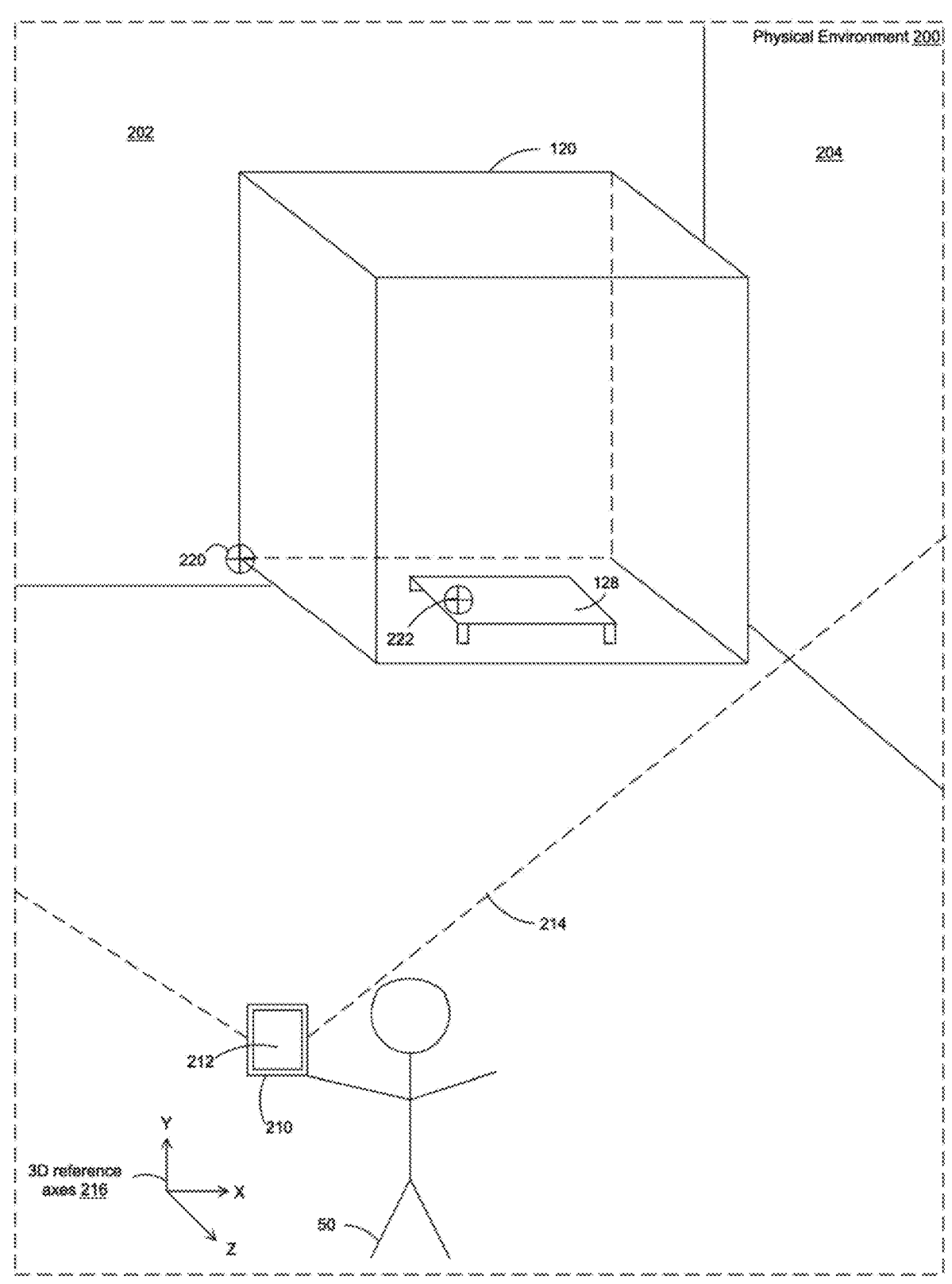

As illustrated in FIG. 2E, a virtual anchor point 222 is within the representation 120. Namely, the virtual anchor point 222 is positioned on the surface of the 2D table 128. The electronic device 210 may set the virtual anchor point 222 according to various implementations, such as via user input (e.g., extremity tracking or eye tracking) or independent of user input.

Figure 2F:
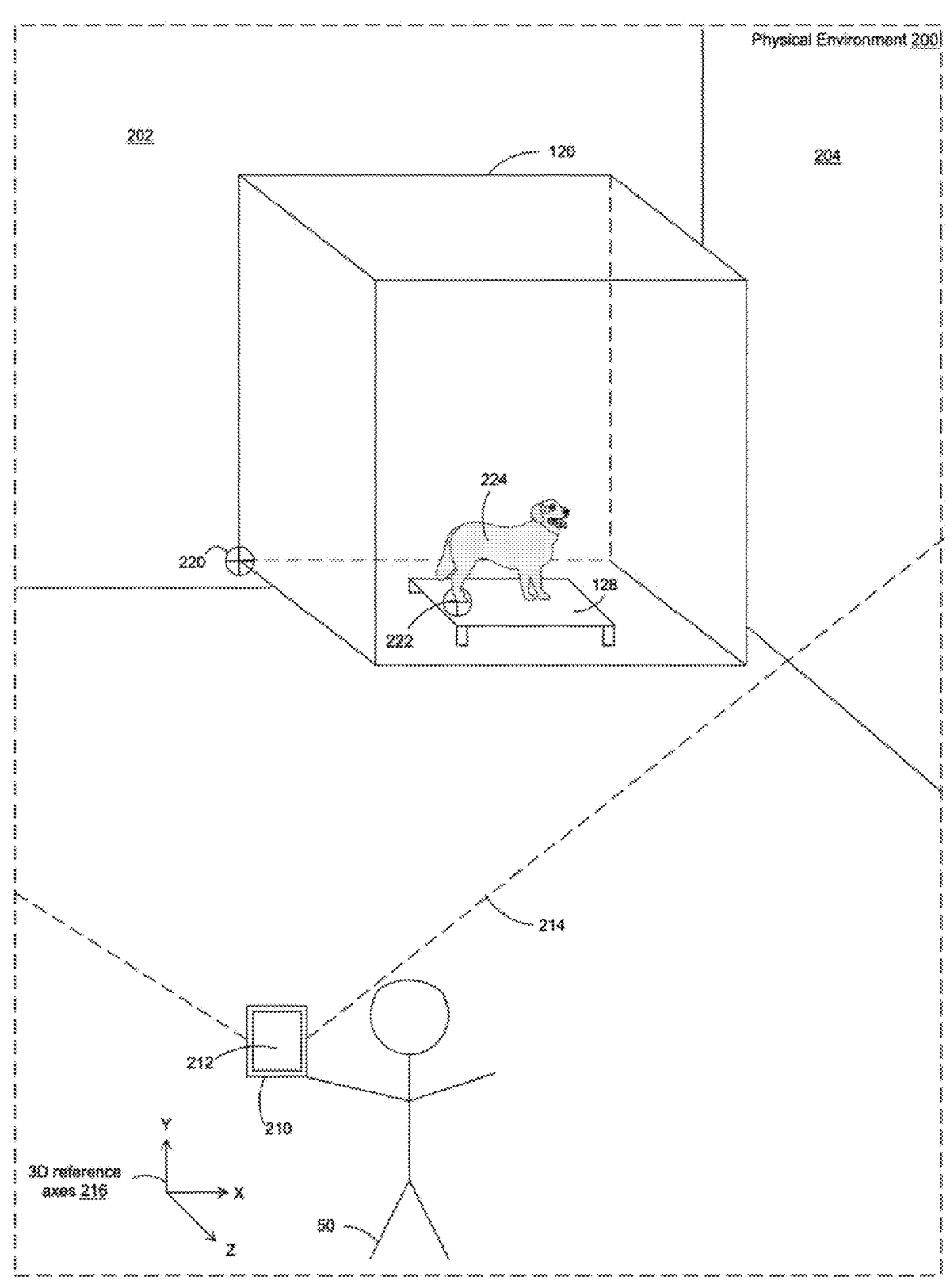

As illustrated in FIG. 2F, the electronic device 210 anchors a computer-generated object 224 (a computer-generated dog 224) to the virtual anchor point 222 of the 2D table 128, based on the pose data 336. For example, the anchoring is based on the plurality of points 218-1, 218-2, and 218-3. In some implementations, anchoring the computer-generated object 224 is in response to setting the virtual anchor point. In some implementations and with reference to FIG. 3, anchoring the computer-generated object 224 is in response to detecting, via the input device 310, a second user input that requests anchoring the computer-generated object 224 to the representation 120. With further reference to FIG. 3, in some implementations, the electronic device 210 includes a second anchoring system 350 that anchors the computer-generated object 224 to the representation 120, based on the pose data 336. For example, the second anchoring system 350 renders the computer-generated object 224 based on the pose data 336, in order to generate a second portion of the display data 354 that appears anchored to the representation 120 on the display 212. Moreover, in some implementations, the compositing system 360 composites the image data 319 with the first portion of display data 344 and the second portion of the display data 354, and displays the composited data 362 on the display 212.

Figure 2G:
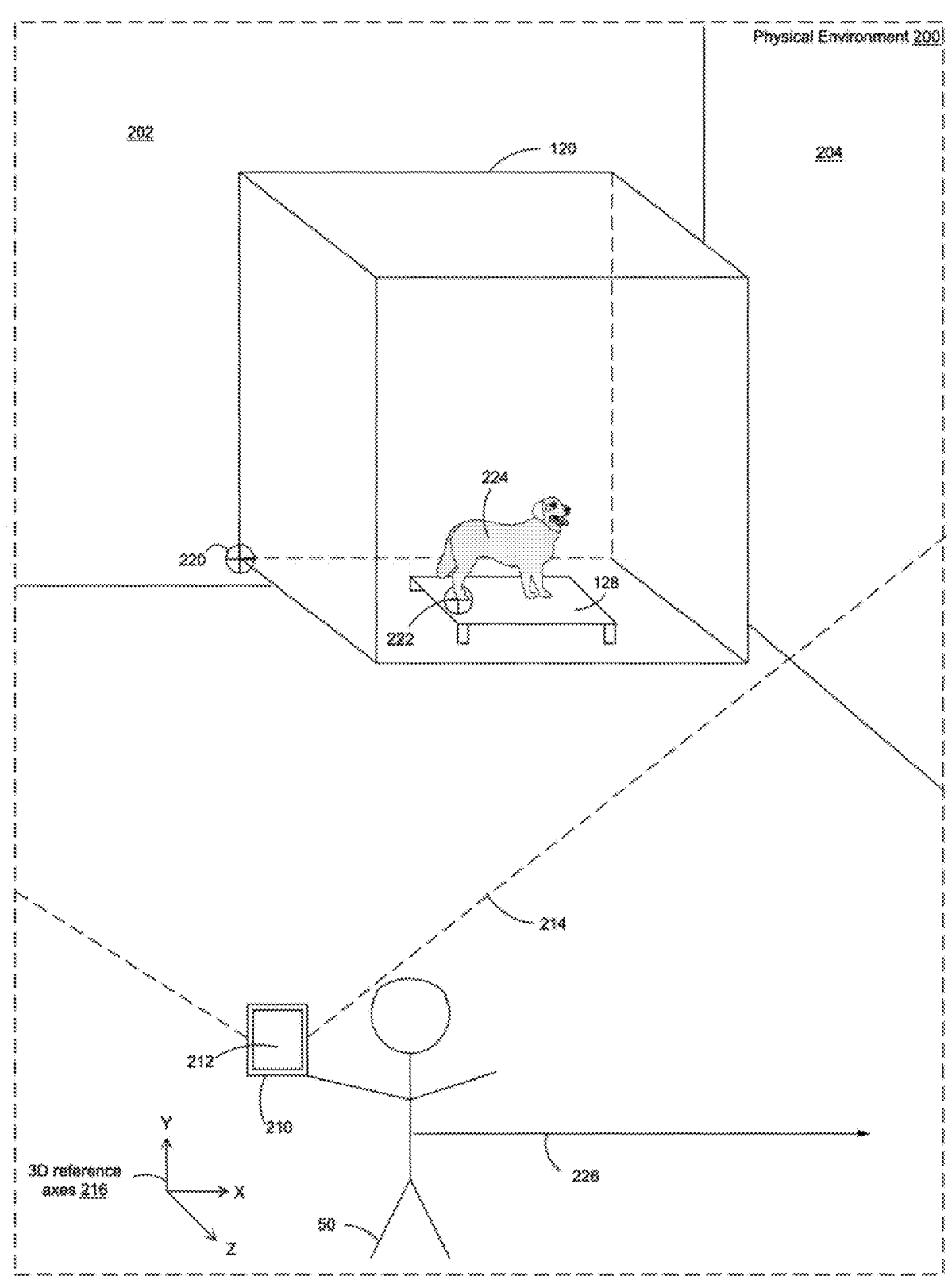
Figure 2H:
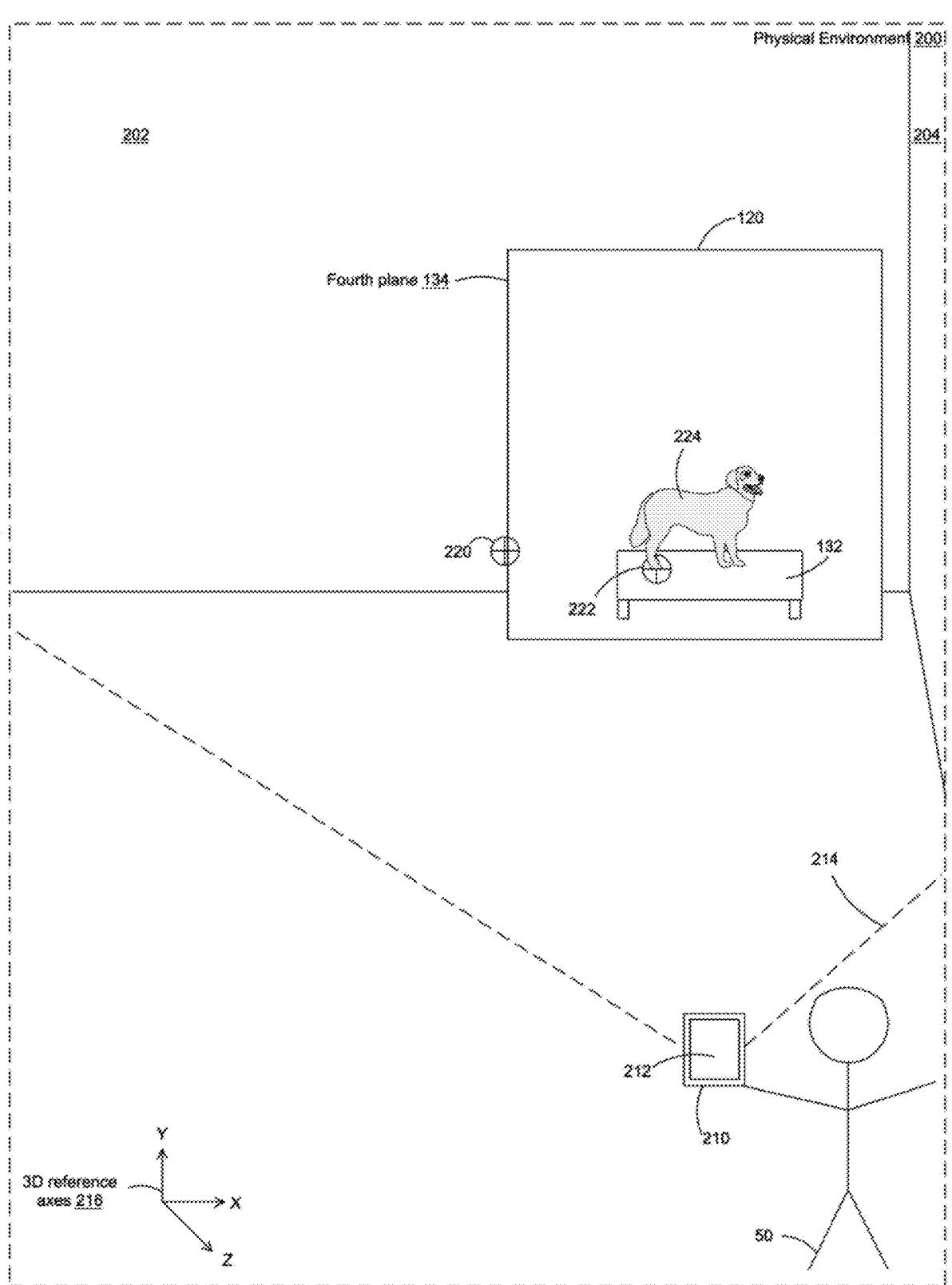

FIGS. 2G and 2H illustrate the electronic device 210 maintaining the anchoring, based on a positional change of the electronic device 210. As illustrated in FIG. 2G, the user 50 moves rightwards along the x plane of the physical environment 200, resulting in a positional change of the electronic device 210 (e.g., a translational movement). The movement is indicated by a movement line 226. Based on the movement, the user 50 faces the representation 120 head-on, as illustrated in FIG. 2H.

The electronic device 210 detects the positional change based on the positional sensor data 316. In response to detecting the positional change, the electronic device 210 maintains anchoring the representation 120 to the physical anchor point 220, based on the pose data 336. To that end, the electronic device 210 anchors a second plurality of planes of the representation 120 to the physical anchor point 220 based on the pose data 336, and ceases to anchor the first plurality of planes of the representation 120 to the physical anchor point 220. For example, whereas the first plurality of planes is associated with a first pose of the electronic device 210 (e.g., illustrated in FIG. 2D), the second plurality of planes is associated with a second pose of the electronic device 210 (e.g., illustrated in FIG. 2H). Each of the second plurality of planes indicates a plurality of points in the xy space. Moreover, none of the second plurality of planes includes z space information. For example and with reference to FIG. 3, the first anchoring system 340 obtains the second plurality of planes of the representation 120, and renders the second plurality of planes, based on the pose data 336, in order to generate a third portion of the display data (not illustrated in FIG. 3), which is displayed on the display 212.

The second plurality of planes of the representation 120 is illustrated in FIG. 2H. Namely, the second plurality of planes includes a fourth plane 134 corresponding to a rectangular plane. The second plurality of planes includes an updated 2D table 132, which includes a rectangular plane comprising the surface of the updated 2D table 132, and two smaller rectangular planes comprising the two visible legs of the updated 2D table 132.

As further illustrated in FIG. 2H, the electronic device 210 maintains anchoring the computer-generated object 224 to the virtual anchor point 222, based on the pose data 336. To that end, the electronic device 120 anchors the computer-generated object 224 to the second plurality of planes, and ceases anchoring the computer-generated object 224 to the first plurality of planes.

Figure 4:
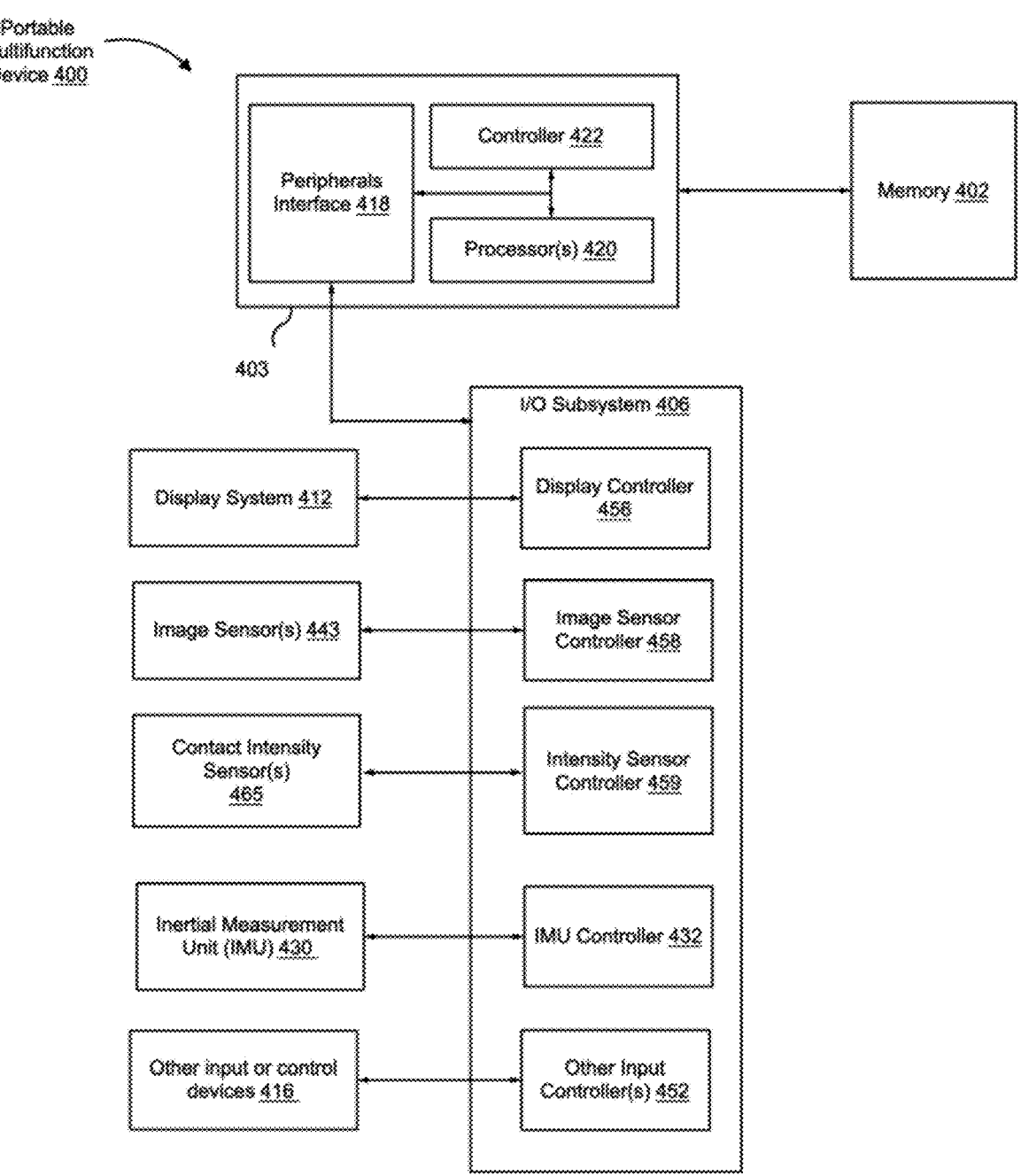
FIG. 4 is a block diagram of an example of a portable multifunction device in accordance with some implementations.

FIG. 4 is a block diagram of an example of a portable multifunction device 400 (sometimes also referred to herein as the "electronic device 400" for the sake of brevity) in accordance with some implementations. In some implementations, the electronic device 210 described with reference to FIGS. 2A-2H and FIG. 3 includes some or all of the components of the electronic device 400.

The electronic device 400 includes a memory 402 (e.g., a non-transitory computer readable storage medium), a memory controller 422, one or more processing units (CPUs) 420, a peripherals interface 418, an input/output (I/O) subsystem 406, a display system 412, an inertial measurement unit (IMU) 430, image sensor(s) 443 (e.g., camera), contact intensity sensor(s) 465, and other input or control device(s) 416. In some implementations, the electronic device 400 corresponds to one of a mobile phone, tablet, laptop, wearable computing device, head-mountable device (HMD), head-mountable enclosure (e.g., the electronic device 400 slides into or otherwise attaches to a head-mountable enclosure), or the like. In some implementations, the head-mountable enclosure is shaped to form a receptacle for receiving the electronic device 400 with a display.

In some implementations, the peripherals interface 418, the one or more processing units 420, and the memory controller 422 are, optionally, implemented on a single chip, such as a chip 403. In some other implementations, they are, optionally, implemented on separate chips.

The I/O subsystem 406 couples input/output peripherals on the electronic device 400, such as the display system 412 and the other input or control devices 416, with the peripherals interface 418. The I/O subsystem 406 optionally includes a display controller 456, an image sensor controller 458, an intensity sensor controller 459, one or more input controllers 452 for other input or control devices, and an IMU controller 432, The one or more input controllers 452 receive/send electrical signals from/to the other input or control devices 416. One example of the other input or control devices 416 is an eye tracker that tracks an eye gaze of a user. Another example of the other input or control devices 416 is an extremity tracker that tracks an extremity (e.g., a finger) of a user. In some implementations, the one or more input controllers 452 are, optionally, coupled with any (or none) of the following: a keyboard, infrared port, Universal Serial Bus (USB) port, stylus, finger-wearable device, and/or a pointer device such as a mouse. The one or more buttons optionally include a push button. In some implementations, the other input or control devices 416 includes a positional system (e.g., GPS) that obtains information concerning the location and/or orientation of the electronic device 400 relative to a particular object. In some implementations, the other input or control devices 416 include a depth sensor and/or a time-of-flight sensor that obtains depth information characterizing a physical object within a physical environment. In some implementations, the other input or control devices 416 include an ambient light sensor that senses ambient light from a physical environment and outputs corresponding ambient light data.

The display system 412 provides an input interface and an output interface between the electronic device 400 and a user. The display controller 456 receives and/or sends electrical signals from/to the display system 412. The display system 412 displays visual output to the user. The visual output optionally includes graphics, text, icons, video, and any combination thereof (sometimes referred to herein as "computer-generated content"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 412 may have a touch-sensitive surface, sensor, or set of sensors that accepts input from the user based on haptic and/or tactile contact. The display system 412 and the display controller 456 (along with any associated modules and/or sets of instructions in the memory 402) detect contact (and any movement or breaking of the contact) on the display system 412 and converts the detected contact into interaction with user-interface objects (e.g., one or more soft keys, icons, web pages or images) that are displayed on the display system 412.

The display system 412 optionally uses LCD (liquid crystal display) technology, LPD (light emitting polymer display) technology, or LED (light emitting diode) technology, although other display technologies are used in other implementations. The display system 412 and the display controller 456 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 412.

The user optionally makes contact with the display system 412 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 400 translates the rough finger-based input into a precise pointer/cursor position or command for performing the actions desired by the user.

The inertial measurement unit (IMU) 430 includes accelerometers, gyroscopes, and/or magnetometers in order to measure various forces, angular rates, and/or magnetic field information with respect to the electronic device 400. Accordingly, according to various implementations, the IMU 430 detects one or more positional change inputs of the electronic device 400, such as the electronic device 400 being shaken, rotated, moved in a particular direction, and/or the like.

The image sensor(s) 443 capture still images and/or video. In some implementations, an image sensor 443 is located on the back of the electronic device 400, opposite a touch screen on the front of the electronic device 400, so that the touch screen is enabled for use as a viewfinder for still and/or video image acquisition. In some implementations, another image sensor 443 is located on the front of the electronic device 400 so that the user's image is obtained (e.g., for selfies, for videoconferencing while the user views the other video conference participants on the touch screen, etc.). In some implementations, the image sensor(s) are integrated within an HMD. For example, the image sensor(s) 443 output image data that represents a physical object (e.g., a physical agent) within a physical environment.

The contact intensity sensors 465 detect intensity of contacts on the electronic device 400 (e.g., a touch input on a touch-sensitive surface of the electronic device 400). The contact intensity sensors 465 are coupled with the intensity sensor controller 459 in the I/O subsystem 406. The contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 465 receive contact intensity information (e.g., pressure information or a proxy for pressure information) from the physical environment. In some implementations, at least one contact intensity sensor 465 is collocated with, or proximate to, a touch-sensitive surface of the electronic device 400. In some implementations, at least one contact intensity sensor 465 is located on the side of the electronic device 400.

Figure 5:
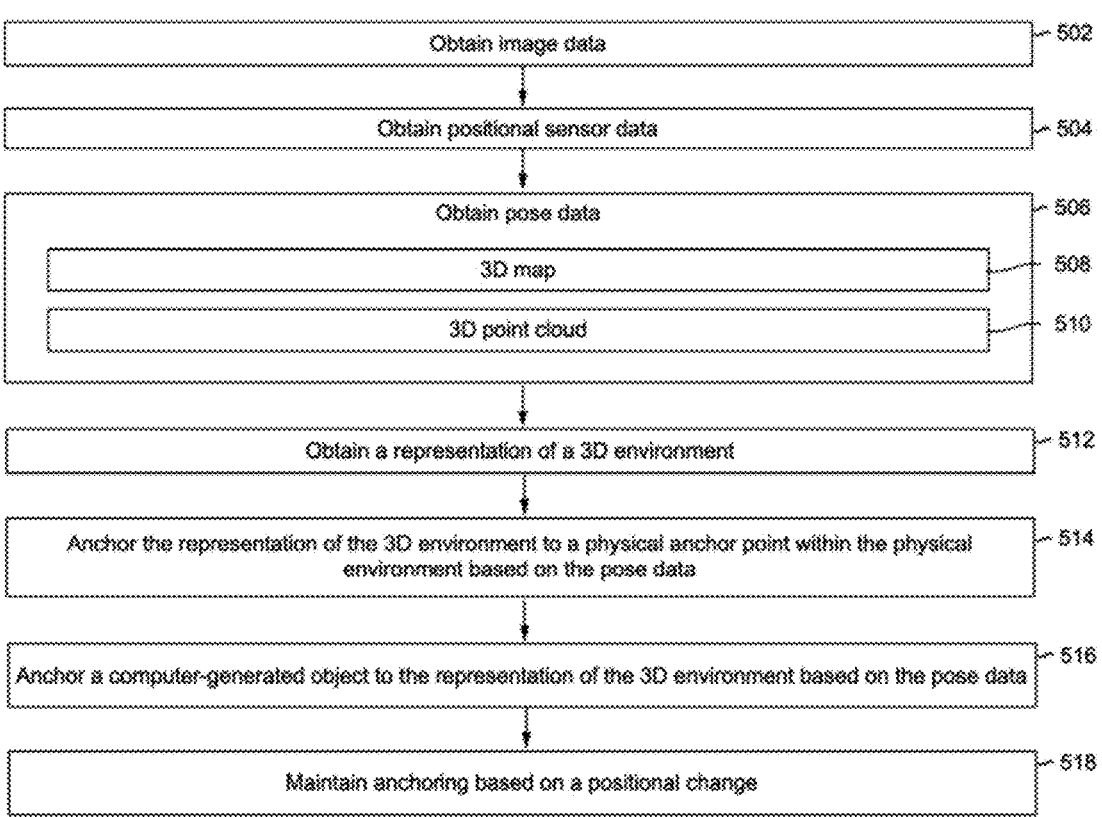
FIG. 5 is an example of a flow diagram of a method of anchoring a computer-generated object to a representation of a 3D environment based on pose data in accordance with some implementations.

FIG. 5 is an example of a flow diagram of a method 500 of anchoring a computer-generated object to a representation of a 3D environment based on pose data in accordance with some implementations. In various implementations, the method 500 or portions thereof are performed by an electronic device (e.g., the electronic device 210 illustrated in FIGS. 2A-2H and FIG. 3, or the electronic device 400 illustrated in FIG. 4). In various implementations, the method 500 or portions thereof are performed by a mobile device, such as a smartphone, tablet, or wearable device. In various implementations, the method 500 or portions thereof are performed by a head-mountable device (HMD) including a display. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, in some implementations, the method 500 includes obtaining image data of a physical environment. For example, with reference to FIGS. 2A and 3, the electronic device 210 includes an image sensor 318 that captures the image data 319 of the physical environment 200.

As represented by block 504, in some implementations, the method 500 includes obtaining positional sensor data characterizing a position or a positional change of the electronic device. The positional change may correspond to a rotational movement, a translational movement, a shaking movement, etc. For example, with reference to FIGS. 2G-2H and FIG. 3, the positional sensor 314 generates the positional sensor data 316, which indicates the translational movement of the electronic device 210 along the x axis of the physical environment 200. One example of the positional sensor is an IMU. Another example of the positional sensor is a magnetic sensor that measures weak magnetic fields.

As represented by block 506, the method 500 includes obtaining pose data that indicates a plurality of poses of the electronic device within a physical environment. In some implementations, the pose data includes 3D positional information regarding the physical environment. The 3D positional information includes one or more points in z space of the physical environment. Accordingly, the 3D positional information includes depth information regarding the physical environment. In some implementations, and with reference to FIG. 3, the map generator 330 generates the pose data 336 based on the image data 319 and the positional sensor data 316. In some implementations, generating the pose data includes applying SLAM (optionally in combination with VIO) with respect to the image data and the positional sensor data. In some implementations, as represented by block 508, obtaining the pose data includes generating a 3D map that characterizes the physical environment. In some implementations, as represented by block 510, obtaining the pose data includes generating a 3D point cloud that characterizes the physical environment. For example, with reference to FIG. 2B, the electronic device 210 generates a 3D point cloud including a first point 218-1, a second point 218-2, and a third point 218-3.

As represented by block 512, the method 500 includes obtaining a representation of a 3D environment that includes a first plurality of planes. Each of the first plurality of planes defines a plurality of points in xy space. Accordingly, none of the first plurality of planes defines a point in z space. In other words, the representation of the 3D environment does not include depth information. For example, with reference to FIG. 1B, the representation of the 3D environment corresponds to the representation 120, which includes a plurality of planes (e.g., the first plane 122, the second plane 124, etc.). Accordingly, in contrast to a corresponding 3D environment that includes z space information (e.g., the 3D environment 100 in FIG. 1A), the representation of the 3D environment is less graphically complex and thus can be rendered more quickly than the 3D environment. Accordingly, rendering a corresponding 3D environment is associated with a first amount of resource utilization by the electronic device, and rendering the representation of the 3D environment is associated with a second amount of resource utilization by the electronic device that is less than the first amount of resource utilization. In some implementations, the representation of the 3D environment corresponds to a 3D representation of a virtual environment, such as a computer-generated Mars environment. In some implementations, the representation of the 3D environment corresponds to a 3D representation of a physical environment. For example, the 3D representation of the physical environment corresponds to a 360 degree image of a real-world room in a user's house.

As represented by block 514, the method 500 includes anchoring the representation of the 3D environment to a physical anchor point within the physical environment based on the pose data. For example and with reference to FIG. 2D, the electronic device 210 anchors the representation 120 to the physical anchor point 220 based on the pose data 336. In some implementations, the physical anchor point is set via a first user input, such as a gaze input or an extremity input.

Moreover, in some implementations, anchoring the representation of the 3D environment is in response to detecting the first user input.

As another example and with reference to FIG. 3, anchoring the representation of the 3D environment includes rendering, via the first anchoring system 340, the representation of the 3D environment 120 based on the pose data 336, in order to generate the first portion of display data 344. Moreover, anchoring the representation of the 3D environment further includes displaying, on the display 212, the first portion of the display data 344 along with image data of the physical environment. The displayed representation of the 3D environment appears anchored to the physical anchor point represented within the image data. As another example and with reference to FIG. 2B, anchoring the representation of the 3D environment is based on points of a 3D point cloud.

As represented by block 516, the method 500 includes anchoring a computer-generated object to the representation of the 3D environment based on the pose data. Anchoring the computer-generated object to the representation of the 3D environment may be based on the point in the z space (e.g., depth information), indicated within the pose data. For example, with reference to FIG. 2F, the electronic device 210 anchors the computer-generated object 224 (e.g., the computer-generated dog 224) to the surface of the 2D table 128, based on the points of the 3D point cloud illustrated in FIG. 2B.

As another example and with reference to FIG. 3, anchoring the computer-generated object includes rendering, via the second anchoring system 350, the computer-generated object 224 based on the pose data 336, in order to generate the second portion of the display data 354. Moreover, anchoring the computer-generated object includes displaying, on the display 212, the second portion of the display data 354 while displaying the first portion of the display data 344 and image data representing the physical environment. The displayed representation of the 3D environment appears anchored to the physical anchor point, and the displayed computer-generated object appears anchored to the representation of the 3D environment.

In some implementations, anchoring the computer-generated object is in response to detecting a second user input that requests anchoring the computer-generated object to the representation of the 3D environment. For example, the method 500 includes detecting the second user input after detecting the first user input. As another example, the method 500 includes detecting the second user input while the representation of the 3D environment is anchored to the physical anchor point.

In some implementations, anchoring the representation of the 3D environment to the physical anchor point is substantially concurrent with anchoring the computer-generated object to the representation of the 3D environment. For example, with reference to FIG. 3, the first anchoring system 340 renders the representation 120 concurrently with the second anchoring system 350 rendering the computer-generated object 224.

As represented by block 518, in some implementations, the method 500 includes maintaining the dual anchoring (representation anchored to the physical anchor point, and computer-generated object anchored to the representation), based on a positional change of the electronic device. To that end, in some implementations, the method 500 includes detecting, based on the positional sensor data, a positional change of the electronic device. For example, with reference to FIG. 3, the electronic device detects the positional change based on the positional sensor data 316. As another example, with reference to FIGS. 2G and 2H, the electronic device 210 detects the translational movement of the electronic device 210 along the x axis, within the physical environment 200. In order to maintain the anchoring, the method 500 includes, in response to detecting the positional change, anchoring a second plurality of planes of the representation of the 3D environment based on the pose data, and anchoring the computer-generated object to the second plurality of planes of the representation of the 3D environment. Each of the second plurality of planes defines a plurality of points in the xy space. For example, as illustrated in FIG. 2H, the second plurality of planes includes a rectangular, fourth plane 134 that defines a number of points in the xy space. As further illustrated in FIG. 2H, based on the translational movement of the electronic device 210, the electronic device 210 maintains the representation anchored to the physical anchor point 220, and maintains the computer-generated object 224 (e.g., the computer-generated dog 224) anchored to the virtual anchor point 222 on the surface of the updated 2D table 132.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure.

The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:

at an electronic device with one or more processors, a non-transitory memory, and a display:

obtaining pose data that indicates a plurality of poses of the electronic device within a physical environment;

obtaining a representation of a three-dimensional (3D) environment, wherein the representation of the 3D environment includes a first plurality of planes, wherein each of the first plurality of planes defines a plurality of points in xy space, and wherein the representation is a modified version of the 3D environment that lacks z space information;

anchoring the representation of the 3D environment to a physical anchor point within the physical environment based on z space information indicated in the pose data; and anchoring a computer-generated object to the representation of the 3D environment based on the pose data.

2. The method of claim 1, wherein none of the first plurality of planes defines a point in z space.

3. The method of claim 2, wherein the pose data includes 3D positional information regarding the physical environment, wherein the 3D positional information includes a point in the z space, and wherein anchoring the computer-generated object to the representation of the 3D environment is based on the point in the z space.

4. The method of claim 1, wherein obtaining the pose data includes generating a 3D map that characterizes the physical environment.

5. The method of claim 1, wherein obtaining the pose data includes generating a 3D point cloud that characterizes the physical environment.

6. The method of claim 1, wherein anchoring the representation of the 3D environment to the physical anchor point includes:

rendering the representation of the 3D environment based on the pose data in order to generate a first portion of display data, and displaying, on the display, the first portion of the display data; and wherein anchoring the computer-generated object to the representation of the 3D environment includes:

rendering the computer-generated object based on the pose data in order to generate a second portion of the display data, and displaying, on the display, the second portion of the display data while displaying the first portion of the display data.

7. The method of claim 1, wherein the representation of the 3D environment corresponds to a 3D representation of a virtual environment.

8. The method of claim 1, wherein the representation of the 3D environment corresponds to a 3D representation of a physical environment.

9. The method of claim 1, wherein anchoring the representation of the 3D environment to the physical anchor point is substantially concurrent with anchoring the computer-generated object to the representation of the 3D environment.

10. The method of claim 1, wherein the electronic device further comprises an image sensor that captures image data of the physical environment, wherein the electronic device further comprises a positional sensor that generates positional sensor data characterizing a position of the electronic device, and wherein obtaining the pose data includes determining the pose data based on the image data and the positional sensor data.

11. The method of claim 10, further comprising:

detecting, based on the positional sensor data, a positional change of the electronic device; and in response to detecting the positional change:

maintaining anchoring the representation of the 3D environment to the physical anchor point by anchoring a second plurality of planes of the representation of the 3D environment based on the pose data, wherein each of the second plurality of planes defines a plurality of points in the xy space; and maintaining anchoring the computer-generated object to the representation of the 3D environment by anchoring the computer-generated object to the second plurality of planes of the representation of the 3D environment.

12. The method of claim 10, wherein determining the pose data includes applying simultaneous localization and mapping (SLAM) to the image data and the positional sensor data.

13. The method of claim 1, wherein a corresponding 3D environment defines a plurality of points in xyz space, and wherein the corresponding 3D environment is more graphically complex than the representation of the 3D environment.

14. The method of claim 13, wherein rendering the corresponding 3D environment is associated with a first amount of resource utilization by the electronic device, and wherein rendering the representation of the 3D environment is associated with a second amount of resource utilization by the electronic device that is less than the first amount of resource utilization.

15. The method of claim 1, further comprising:

detecting a first user input that specifies the physical anchor point, wherein anchoring the representation of the 3D environment to the physical anchor point is in response to detecting the first user input.

16. The method of claim 15, further comprising detecting a second user input that requests anchoring the computer-generated object to the representation of the 3D environment, wherein anchoring the computer-generated object to the representation of the 3D environment is in response to detecting the second user input.

17. An electronic device comprising:

a display;

a non-transitory memory; and one or more processors to:

obtain pose data that indicates a plurality of poses of the electronic device within a physical environment;

obtain a representation of a 3D environment, wherein the representation of the 3D environment includes a first plurality of planes, wherein each of the first plurality of planes defines a plurality of points in xy space, and wherein the representation is a modified version of the 3D environment that lacks z space information;

anchor the representation of the 3D environment to a physical anchor point within the physical environment based on z space information indicated in the pose data; and anchor a computer-generated object to the representation of the 3D environment based on the pose data.

18. The electronic device of claim 17, wherein none of the first plurality of planes defines a point in z space, wherein the pose data indicates a point in the z space, and wherein anchoring the computer-generated object to the representation of the 3D environment is based on the point in the z space.

19. The electronic device of claim 17, wherein the electronic device further comprises an image sensor that captures image data of the physical environment, wherein the electronic device further comprises a positional sensor that generates positional sensor data characterizing a position of the electronic device, and wherein obtaining the pose data includes determining the pose data based on the image data and the positional sensor data.

20. A non-transitory computer readable storage medium storing one or more programs, the one or more programs comprising instructions, which, when executed by an electronic device including a display, cause the electronic device to:

obtain pose data that indicates a plurality of poses of the electronic device within a physical environment;

obtain a representation of a 3D environment, wherein the representation of the 3D environment includes a first plurality of planes, wherein each of the first plurality of planes defines a plurality of points in xy space, and wherein the representation is a modified version of the 3D environment that lacks z space information;

anchor the representation of the 3D environment to a physical anchor point within the physical environment based on z space information indicated in the pose data; and anchor a computer-generated object to the representation of the 3D environment based on the pose data.

\*    \*    \*    \*    \*